April 2, 1963  L. A. B. PILKINGTON  3,083,551
MANUFACTURE OF FLAT GLASS
Filed June 7, 1957  2 Sheets-Sheet 1
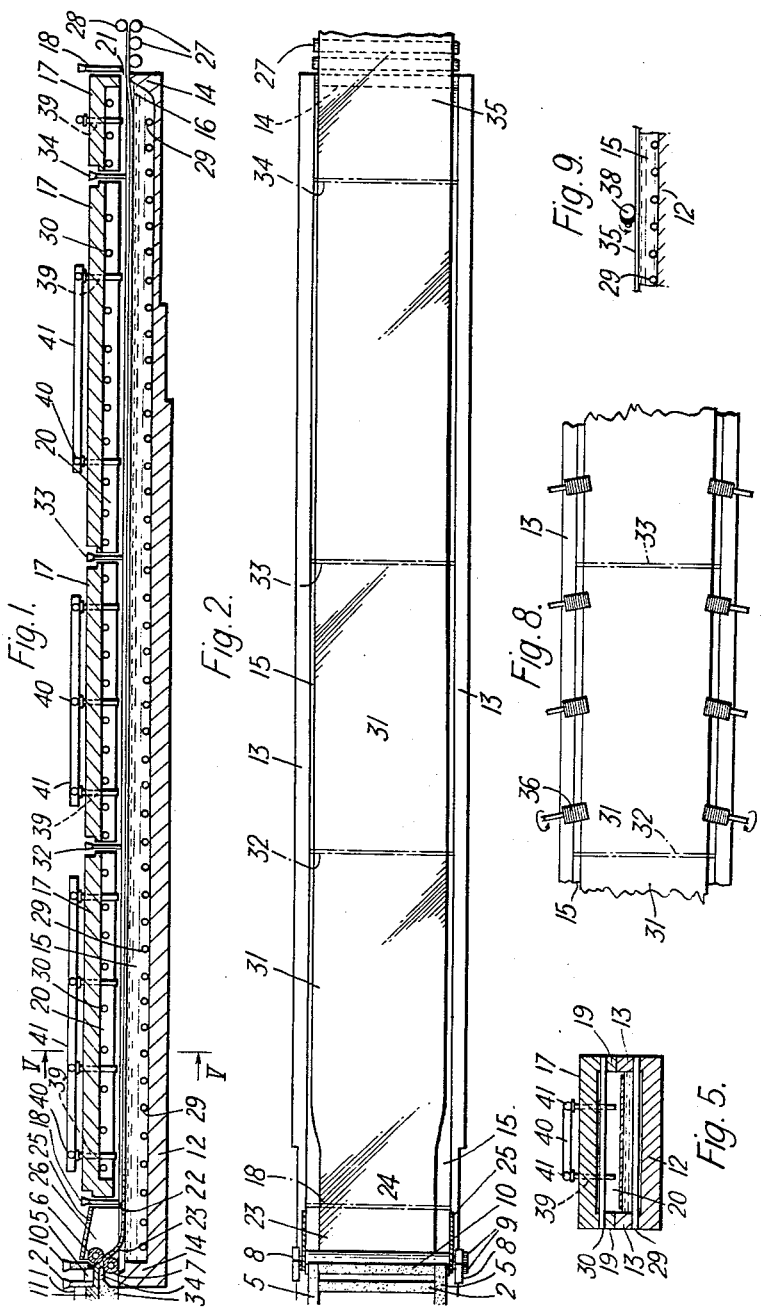
Inventor
L. A. B. Pilkington
By
Morrison, Kennedy, Campbell
Attorneys April 2, 1963   L. A. B. PILKINGTON   3,083,551
MANUFACTURE OF FLAT GLASS
Filed June 7, 1957                                        2 Sheets-Sheet 2
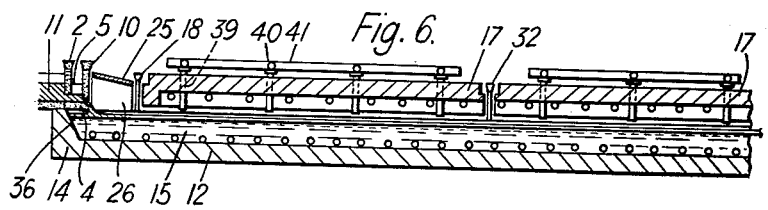
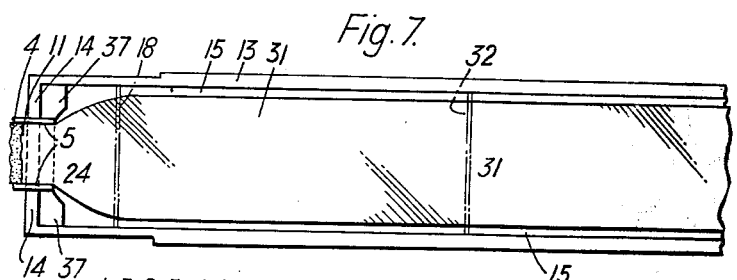
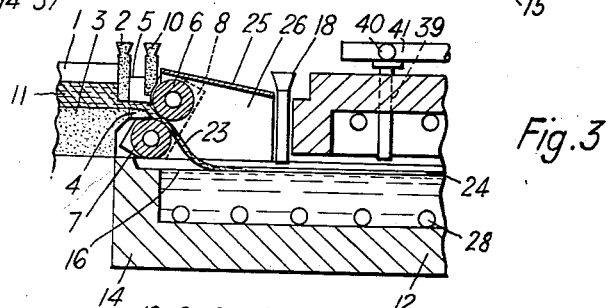
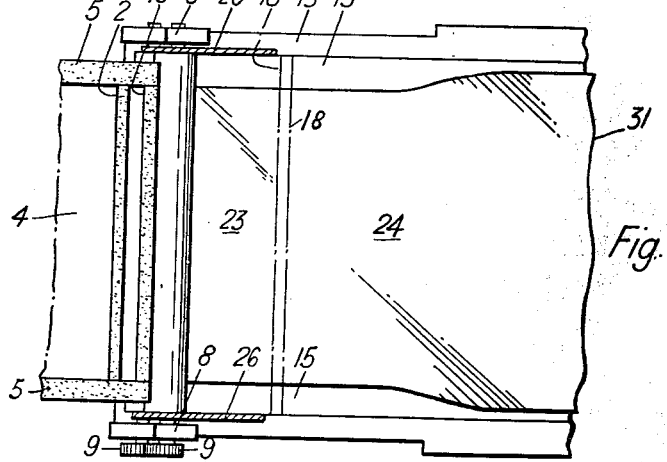
Inventor
L. A. B. Pilkington
By
Attorneys 3,083,551
MANUFACTURE OF FLAT GLASS
Lionel A. B. Pilkington, The Crossways, England, assignor to Pilkington Brothers Limited, Liverpool, England, a company of Great Britain
Filed June 7, 1957, Ser. No. 664,245
Claims priority, application Great Britain May 3, 1957
12 Claims. (Cl. 65—32)

This invention relates to the manufacture of flat glass.

In the manner of manufacture of flat glass by the usual rolling methods imperfections on the roller surfaces are imparted to the surfaces of the glass as well as variations in thickness hereinafter sometimes referred to as distortions due to asymmetry in one or both of the rolls.

In the manufacture of a ribbon of glass by the usual drawing methods the glass produced has a lustrous "fire finished" surface, but distortions occur in the drawn sheet as a result of local temperature differences before the sheet has set, and the process is slower than the rolling process.

The main object of the present invention is to produce flat glass in ribbon form which has a lustre of a quality such as that known as "fire-finish" and is free from distortions such as occur in either the known rolling or known drawing methods of producing glass in ribbon form. Another main object is to accelerate the production of flat glass in ribbon form free from distortion and which preferably has a lustre of fire finish quality.

A method of manufacturing flat glass according to the present invention comprises the steps of delivering glass at a controlled rate to a bath of molten metal and advancing the glass along the surface of the bath under thermal conditions which assure that a layer of molten glass is established on the bath and thereafter that, while unhindered lateral flow of the side edges of the molten layer is ensured, there is developed on the surface of the bath a buoyant body of molten glass of stable thickness, and thereafter continuously advancing the buoyant body in ribbon form along the bath and sufficiently cooling this ribbon as it is advanced to permit it to be taken unharmed out of the bath by mechanical means.

Accordingly in carrying out the present invention at least the edges of the molten body which are contiguous to the molten body of stable thickness, as well as the edges of the molten body which has flowed to stable thickness are unhindered in their movement across the bath whether the molten glass is spreading in achieving the lateral flow or whether the width dimension of the molten glass is being progressively reduced during the development of the molten glass of stable thickness.

Experiments have shown that at elevated temperatures e.g. 900° C. or over, a buoyant (freely floating) body of molten glass supported on a bath of molten metal automatically achieves a condition of stable thickness, if it is permitted to flow laterally on the bath without constraint, the stable thickness being achieved when the lateral flow ceases, i.e. when equilibrium has been established, or substantially so, between the forces of surface tension of the molten glass and the molten metal and the forces of gravity, and that the glass in the stable body is of specific and uniform thickness except near the edges, the surfaces being free of distortion.

The glass delivered to the bath of molten metal may be either in ribbon form or in a molten state.

The present invention accordingly comprises a method of manufacturing flat glass comprising the steps of forming a ribbon of glass of predetermined dimensions and delivering the ribbon at a controlled rate to the bath of molten metal and advancing the ribbon along the surface of the bath under thermal conditions which transform the ribbon into a layer of molten glass and thereafter that, while unhindered lateral flow of the side edges of the molten layer is ensured, there is developed on the surface of the bath a buoyant body of molten glass of stable thickness, and thereafter continuously advancing the buoyant body in ribbon form along the bath and sufficiently cooling this ribbon as it is advanced to permit it to be taken unharmed out of the bath by mechanical means.

By suitable regulation of heat in the bath, a rate of development of the buoyant body of stable thickness can be achieved which enables a ribbon produced at ordinary rolling speeds, or at greater speeds, to be converted to molten glass, developed to a body of molten glass of stable thickness and reformed into a ribbon, free of distortion including any imparted by the forming roller and with high lustre surfaces as a continuous process; in particular, a ribbon of approximately quarter-inch thickness with high lustre surfaces can be produced at a rate at least equal to ordinary rolling speeds.

In the manufacture of flat glass according to the invention, wherein molten glass is supplied to the bath of molten metal, the molten glass is delivered at a controlled rate to a bath of molten metal and advanced as a layer along the surface of the bath under thermal conditions which maintain the layer in a molten state and thereafter that, while unhindered lateral flow of the side edges of the molten layer is ensured, there is developed on the surface of the bath a buoyant body of molten glass of stable thickness, and thereafter continuously advancing the buoyant body in ribbon form along the bath and sufficiently cooling this ribbon as it is advanced to permit it to be taken unharmed out of the bath by mechanical means.

The ultimate ribbon produced will, generally speaking, be a ribbon of glass of the thickness predicated by establishing the buoyant body of molten glass of stable thickness and the thickness of the ribbon of glass produced from the buoyant body of molten glass of stable thickness, or substantially so, may be varied by modifying the traction effort applied to the ribbon while controlling the width of the buoyant body of stable thickness in order to predetermine the ultimate thickness of the ribbon to be taken from the bath. Accordingly the present invention comprehends a modified method of manufacture for the ultimate ribbon in which the thickness of glass taken from the bath is different from that of the molten body of stable thickness, e.g. by attenuation to predetermine the ultimate thickness of the ribbon to be taken from the bath. To this end, the speed of the traction rollers which take the ribbon from the bath to the lehr may be increased, and edge rolls provided to control the width for the ribbon as hereinafter fully explained.

The temperature at which a molten glass body of stable thickness, or substantially so, in accordance with the invention is completed will vary with the composition of the glass. For the soda-lime compositions of plate and sheet glasses the development of the stable body of molten glass may be achieved above 850° C., that is to say at a temperature at which the viscosity of the glass is low enough for the surface tension and gravitational forces to cause the glass to flow.

In the development of the body of molten glass of stable thickness on the molten metal bath in accordance with the invention the surface of the bath is free of glass contaminants and to this end the formation of contaminants for the glass may be prevented by maintaining a protecting atmosphere over the bath, thus the surface of the bath exposed beyond each edge of the molten body of glass of stable thickness and any exposed at each side of the ultimate ribbon produced therefrom may be protected against oxidation, and the production of contaminants which would reach the interface between the glass and the bath and arise from chemical reaction at the surface of the bath, is inhibited. Protection is also thus afforded for the bath surface exposed under the ultimate ribbon as the latter is lifted from the bath and approaches and passes through the exit end of the bath by the protecting gases.

In constituting the molten bath used for methods of operation according to the present invention with soda-lime glasses, the following characteristics for the bath must be observed:

(1) Melting point below 700° C. approximately.
(2) Boiling point above 1,000° C.
(3) Metal must be denser than glass.
(4) Metal must not stick to glass or react chemically with it to any great extent.

The metal used in the bath should be substantially inert with respect to the material from which the confining tank is made, substantially inert to the atmosphere above the bath and in any case, should be substantially incapable of forming reaction products which would adversely affect the quality of the glass.

Experiments have shown that of the common pure metals, tin fulfills all the requirements for the bath. Owing to the high cost of tin, other metals and alloys may be contemplated for reasons of economy. Lead, for instance, fulfills the above requirements but has the disadvantage that in spite of its cheapness, it necessitates a plant for disposing of any toxic fumes which might be generated at the temperatures at which the methods of operation herein described are carried out. The known thermal conductivity of tin, which results in even heat treatment of the glass floated thereon, makes tin a suitable material; and in a preferred construction according to the invention, the molten bath is constituted by tin.

The present invention also comprehends apparatus for carrying out the method of producing flat glass herein described comprising, in combination, a tank containing a bath of molten metal having an inlet and an outlet to and from the bath, means for delivering glass at a controlled rate through the inlet to the bath and advancing the glass along the surface of the molten metal, heat regulators for maintaining thermal conditions in the bath to assure that a buoyant layer of molten glass is established on the bath and that a buoyant body of stable thickness is developed therefrom on the bath surface, the configuration of the tank being such that at the bath surface and at least in the region where the said layer and the buoyant body of stable thickness is developed, the width of the tank is greater than the width of the molten glass body of stable thickness, means for advancing the glass so that the edges of the molten glass body of stable thickness are maintained in spaced relation with the tank side walls in ribbon form along the bath, and temperature regulators for the bath to sufficiently cool the ribbon to permit it to be taken unharmed through the outlet by mechanical means.

The apparatus constructed according to the invention may comprise in combination a furnace for melting glass, a tank containing a bath of molten metal having an inlet and an outlet to and from the bath, regulated means for forming a ribbon of glass from the melted glass in the furnace and for delivering the ribbon of glass through the inlet to the bath and advancing the glass along the surface of the molten metal, heat regulators for maintaining in the bath thermal conditions which transform the ribbon into a molten state and assure that a buoyant layer of molten glass is established on the bath and that a buoyant body of stable thickness is developed therefrom on the bath surface, the configuration of the tank being such that at the bath surface and at least in the region where the said layer and the buoyant body of stable thickness are developed the width of the tank is greater than the width of the molten glass body of stable thickness so that the edges of the said body of stable thickness are maintained in spaced relation with the tank side walls, means for advancing the glass body of stable thickness in ribbon form along the bath, and temperature regulators for the bath to cause the bath to sufficiently cool the ribbon thus formed to permit it to be taken unharmed through the outlet by mechanical means.

Apparatus constructed according to the invention in which glass in a molten state is fed to the bath may comprise in combination a furnace for melting glass, pouring means leading therefrom and regulating means therefor, a tank containing a molten metal bath having an inlet and an outlet, said spout pouring means delivering molten glass from the furnace to the bath at a controlled rate and advancing the glass layer thus formed along the surface of the bath, heat regulators for maintaining thermal conditions which assure that a buoyant body of stable thickness is developed on the bath surface from the said layer, the configuration of the tank being such that at the bath surface and at least in the region where the buoyant body of stable thickness is developed from the said layer the width of the tank is greater than the width of the molten glass body of stable thickness so that the edges of the molten glass body of stable thickness are maintained in spaced relation with the tank side walls, means for advancing the glass body of stable thickness in ribbon form along the bath, and temperature regulators for the bath to cause the bath to sufficiently cool the ribbon thus formed to permit it to be taken unharmed through the outlet by mechanical means.

From the foregoing it will be observed that the configuration of the tank containing the molten metal is such that at the surface level of the bath the minimum distance between its side walls which flank the body of stable thickness is greater than the width of that body.

Where there is a probability that contaminants for the glass will be formed by reaction between gases over the bath and the molten metal of the bath during the operation of a process according to the present invention, ducting will be provided for maintaining a chemically suitable gas over the bath surface to prevent such a reaction. Especially will a protecting gas be maintained over the bath, where the molten metal of the bath is, at the temperature of the process, a readily oxidisable metal, e.g. tin, in which case a non-oxidising gas will be used to cover the exposed surfaces of the bath.

In apparatus for producing a continuous ribbon of glass according to the invention transverse pairs of horizontally disposed driven edge rolls may be provided to act only on the upper surface of the advancing glass in ribbon form, said rolls having their axes inclined to the ribbon edge so that as they rotate they tend to prevent a reduction in the width of the ribbon, the direction of rotation being such that they tend to assist in advancing the ribbon.

In order that the invention may be more clearly understood, reference will now be made to the accompanying diagrammatic drawings which show, by way of example, preferred embodiments thereof.

In the drawings:

FIG. 1 is a central longitudinal sectional elevation of apparatus, comprising a tank structure for a bath of molten metal and a superimposed roof structure, in which apparatus the glass delivered to the bath is fed in ribbon form;

FIG. 2 is a plan view of the tank structure of the apparatus shown in FIG. 1;

FIGS. 3 and 4 are detail views to a larger scale but corresponding to FIGURES 1 and 2 respectively, more clearly showing the means of forming and feeding a ribbon of glass to the molten bath;

FIG. 5 is a transverse sectional elevation taken on the line V—V of FIG. 1;

FIGS. 6 and 7 are part sectional elevation and plan views corresponding respectively to FIGS. 1 and 2 showing a modified method of delivering glass to the bath of molten metal;

FIG. 8 is a detail plan view of a further modified form of apparatus according to the invention showing the employment of transverse pairs of edge rolls engaging on plastic glass of stable thickness in ribbon form which eventually emerges as a stiffened ribbon from the bath of molten metal; and FIG. 9 is a detail drawing of one of the edge rolls engaging the plastic glass in ribbon form.

In the drawings like references designate the same or similar parts.

Referring first to the construction shown in FIGS. 1 to 5 a forehearth of a continuous glass melting tank is indicated at 1, the regulating tweel at 2 and the spout at 3, the spout comprising a floor or "lip" 4 and side jambs 5, one of which only is illustrated in FIG. 1, the side jambs and lip forming a spout of generally rectangular cross-section. In known manner, a cover may be secured over the spout.

Operatively associated with the spout are a pair of water-cooled casting rolls, the upper of which is indicated at 6 and the lower casting roll at 7 mounted in frames 8, 8 in usual manner and driven through tooth wheels 9, 9 by power means. A gate 10 is adjustably suspended in known manner (by means not shown) in a vertical plane in contiguity with the casting roll 6. The gate 10 shields the top roller 6 from the heat radiated by the molten glass 11 flowing from the forehearth over the lip 4 to the pass between the rolls 6, 7.

The upper casting roll 6 is disposed in advance of the lower casting roll 7 so that the molten glass 11 flows from the lip floor on to an upper part of the roll 7 presenting to the glass a downwardly and forwardly directed arcuate casting bed moving in the same sense as the direction of flow from the spout, thus the molten glass on leaving the spout and arriving on this casting bed is constrained to flow forwardly thereby preventing backward flow of the molten glass leaving the spout 4.

The conventional ribbon forming means just described is, in accordance with one feature of the invention, disposed over the floor 12 of a tank structure, including side walls 13 joined together by end walls 14, 14 integral with the side walls and to the floor, which structure confines a bath 15 of molten tin, the level of the surface of which is indicated at 16. The configuration of the tank illustrated is such that the distance between the side walls 14, 14 is at every point along the bath wider than the width of the glass on the bath.

This tank structure supports a roof structure including a roof 17, a vertically adjustable end wall 18 and side walls 19 (see FIG. 2), so that the roof structure provides a tunnel over the bath 15 and defines a head-space 20.

The adjustable end wall 18 of the roof structure at the discharge end and the corresponding end wall 14 of the tank structure form between them a narrow outlet 21 from the bath, the end wall 18 adjacent the casting rolls 6, 7 being adjusted to form a narrow inlet 22 for the ribbon 23 as it is advanced under the roof structure by the ribbon forming means.

Outside the discharge end of the tank is mounted mechanical conveying means, exemplified by driven rollers 27 disposed somewhat above the level of the bottom of the outlet 21, and superimposed driven rollers 28; the rollers 27 and 28 co-operate to apply a tractive effort to the ribbon of glass moving towards the outlet, which tractive effort assists in advancing the glass along the bath. The ribbon passes out of the bath on the rollers 27, which rollers direct this ribbon to a conventional tunnel lehr (not shown).

Between the ribbon forming rolls 6, 7 and the adjustable wall 18 an extension of the roof structure is provided, this extension forming a chamber enclosing the ribbon forming means; the chamber comprising a ceiling 25 and side walls 26 carried by the side walls 13 of the tank structure.

The temperature of the bath in the tank structure is regulated from the inlet end to the discharge end by providing thermal regulators, indicated at 29, immersed in the molten metal. The headspace 20 over the bath is preferably heated by radiant heat directed downwardly from the roof, and to this end heaters 30 may be mounted in the roof.

The thermal regulators 29, 30 at the entry end of the apparatus are devised to maintain a temperature of about 1,000° C. or slightly higher over a sufficient length of the bath to transform the ribbon 23 into a buoyant layer of molten glass 24 from which is developed a buoyant body 31 of molten glass of stable thickness. This length of the bath is defined between a tweel 32 and the end wall 18 at the entry end of the structure, and the thermal regulators in the roof and tank structures disposed between the tweel 32 and the end wall 18 at the discharge end of the apparatus are controlled so that the molten glass of stable thickness in ribbon form which has passed under the tweel 32 is progressively cooled from there to the discharge end.

To assist the regulation of the temperature between the tweel 32 and the discharge end, other tweels 33 and 34 may be provided in the roof structure so as to further partition the headspace 20 over the bath. For example, a suitable temperature gradient of descending values may be achieved by adjusting the temperature regulators 29 and 30 so that the temperature of the bath under the headspace up to the tweel 32 is about 1,000° C., and between the tweel 32 and the tweel 33 descends to 825° C., and between the tweel 33 and the tweel 34 further descends to a temperature at which the ribbon surface has been sufficiently stiffened to allow its transfer to a lehr on mechanical conveying means without detriment to the surfaces, e.g. a temperature (about 650° C.) at which the viscosity is about $10^7$ poises.

As clearly shown in FIGURE 2 of the drawings, the ribbon 23 fed to the bath has a width somewhat less than that which is drawn from the outlet end, but is slightly thicker than the intended thickness for the ultimate ribbon which is indicated at 35.

Thus by predetermining the dimensions of the ribbon fed to the bath, i.e. formed between the casting rolls 6, 7 and the rate of rolling, a buoyant body of molten glass of stable thickness is constantly maintained, the rate of discharge being substantially the same as the rate of rolling, and it will be observed that the width of the bath in the tank structure is such that the surface of the molten metal forming the bath is exposed on each side of the edges of the ribbon 23 of the layer of molten glass 24 formed therefrom and of the body 31 of molten glass of stable thickness developed from the layer of molten glass 24. Thus the molten glass in the layer 24 and in the body 31 is buoyant so that the molten glass in the layer 24 is free to progressively flow across the bath to develop the body of stable thickness, the body of stable thickness being fully developed when equilibrium has been established, or substantially so, between the forces of surface tension of the molten glass and the molten metal, and the forces of gravity.

Accordingly from this aspect of the invention, the present invention comprehends a method of manufacturing flat glass comprising the steps of delivering glass at a controlled rate to a bath of molten metal and advancing it along the surface of the bath under thermal conditions which establish on the bath a buoyant body of molten glass having a viscosity low enough for the surface tension and gravitational forces to cause the glass to flow on the surface of the metal bath, permitting the buoyant molten glass body in its advance to flow laterally across the bath until the body by unhindered flow of the molten glass attains a condition of equilibrium and therefore of stable thickness, and continuously advancing the body of molten glass of stable thickness along the bath and sufficiently cooling it in its advance to permit it to be taken unharmed as a ribbon out of the bath by mechanical means.

In creating the condition of equilibrium in the molten glass any distortion in a mechanically formed ribbon e.g. the ribbon 23 delivered to the bath, entirely disappears and a body of molten glass which has assumed level formation is developed from which is produced a ribbon of glass of uniform thickness free of distortion and having a fire finish.

The ultimate ribbon thus produced will have a thickness predicated by the formation of the buoyant body 31 of molten glass of stable thickness, i.e. in a state of equilibrium, and the width of that body.

Preferably the edges of the ultimate ribbon 35 are also free edges, that is the side walls 13 of the tank are spaced from the ribbon edges.

Instead of regulating the delivery of glass to the bath by feeding a ribbon of glass to the bath, glass in molten form may be supplied from the spout of a forehearth. Such a construction is exemplified in FIGS. 6 and 7 and in such construction the function of the gate 10 is to afford a constant regulation of the flow of the molten glass from the spout lip 4; thus the flow is controlled by the regulating tweel 2 and the gate 10.

As clearly indicated in FIG. 6, the spout, in constructions according to the invention, is vertically spaced from the surface of the bath 15 so that molten glass has a free fall of a few inches to the bath, and the distance is such as to ensure a heel 136 being formed behind the glass flowing to the bath which heel is extended rearwardly under the spout lip 4 to the end wall 14.

The molten metal of which the bath is constituted is at the entry end to each side of the heel covered by tile 37 which extends from the end wall 14 forwardly of the spout lip 4, the heel wetting the end wall 14 between the tiles so that the surface of the bath under the spout which would otherwise be exposed is protected against access thereto of outside air. The molten glass flowing from the spout thus flows over the spout lip 4 forwardly on to the bath on which the glass is advanced.

As clearly shown in FIG. 7, the spout is preferably of a width which is about half the width of the buoyant body 31 of stable thickness formed between the tweels 18 and 32. On leaving the spout the glass forms a buoyant molten layer indicated at 24 on the bath and the buoyant body of stable thickness is developed therefrom by the maintenance of a temperature of 1,000° C. or more, in that part of the bath between the tweels 18 and 32.

As in operating the apparatus illustrated in FIGS. 1–5 the ultimate ribbon 35 produced by the apparatus in FIGS. 6 and 7 from the buoyant body 31 of stable thickness will have the same dimensions as the latter body.

However, in either form of apparatus the thickness of the ultimate ribbon may be modified by increasing the speed of the rolls 27, 28 thereby modifying the traction effort to attenuate the glass body of stable thickness 31 as it is advanced along the bath. By using transverse pairs of horizontally disposed edge rolls indicated at 36 (FIGS. 8 and 9) acting only on the upper surface of the plastic glass, a ribbon can be produced at the discharge end which has a width which is equal to the width of the buoyant body of the molten glass of stable thickness but is not so thick as the stable body.

The optimum disposition of the transverse pairs of edge rolls 36 is in general indicated in FIG. 8 by reference to the position of the tweels 32, 33.

In the apparatus shown in FIGS. 1–5 and in the apparatus shown in FIGS. 6 and 7, the roof structure is at intervals provided with ducting 39 connected by branches 40 to headers 41 through which a protecting gas is fed into the headspace 20 of the structure at a rate to create a plenum in the headspace. The protecting gas is a gas which will not chemically react with tin to produce contaminants of the glass as for example tin oxide or a tin sulphide. Conveniently ordinary commercial coal gas can be supplied through the ducting 39 to afford a non-oxidising atmosphere and by providing a plenum ingress to the headspace 20 of atmospheric air is prevented.

The headers may be sectionalised so as to extend for predetermined lengths along the bath corresponding to the distance between the tweels and provided with heaters so that the temperature of the protecting gas entering the headspace may be precisely regulated, as will be well understood.

Further, in constructions such as are shown in FIGS. 1 to 5, the protecting gas fed to the headspace 20 can be admitted either by pipes (not shown) to the chamber, defined by the ceiling 25 and side walls 26, or by adjusting the tweel 18 so that an atmosphere of the protecting gas is maintained in this chamber.

As regards the construction illustrated in FIGS. 6 and 7, the chamber provides a means of maintaining a sufficient volume of the protecting gas over that part of the bath exposed to each side of the molten glass in the chamber.

The control of the flow of molten glass to the bath of molten metal may be regulated by employing a tiltable spout as described in U.K. patent specification No. 518,415. The spout in such construction comprises a pivoted nozzle which is movable in a vertical plane with respect to the convex end wall of the forehearth, and by regulating the angle of tilt of the spout the rate of flow from the spout may be adjusted and the spout end may intersect the surface of the bath.

The present invention comprises as a new article of manufacture, flat glass having a lustre equivalent to that known as "fire-finish," said glass being of uniform thickness and substantially free of surface distortions without grinding.

In particular, the present invention comprises as a new article of manufacture, flat glass having a lustre equivalent to that known as "fire-finish" produced in accordance with the method of operation herein described.

Although in the apparatus described the tank is shown as having dimensions over its full length such that the glass delivered to the bath does not touch the sides of the tank, the present invention comprises apparatus in which the glass delivered or the glass in the molten layer 24 formed touches a conforming wall or wets a divergent spout, but in all constructions the tank dimensions are such that the glass in the molten body 24 can be developed into a buoyant body of molten glass of stable thickness by assuring full freedom of lateral movement in the process of developing the buoyant molten body of stable thickness.

I claim:

1. A method of manufacturing flat glass which comprises the steps of delivering glass at a controlled rate to a bath of molten metal and advancing the glass along the surface of the bath under thermal conditions which assure that a layer of molten glass is established on the bath, maintaining said glass layer in molten condition until there is developed on the surface of the bath a buoyant body of molten glass of stable thickness by permitting said layer of molten glass to flow laterally unhindered to the limit of its free flow under the influence of gravity and surface tension, and thereafter continuously advancing the buoyant body in ribbon form along the bath and sufficiently cooling this ribbon as it is advanced to permit it to be taken undamaged out of the bath by mechanical means.

2. A method according to claim 1, wherein the thickness of the ribbon of glass produced from the buoyant body of molten glass of stable thickness is varied by modifying the traction effort applied to the ribbon while controlling the width of the buoyant body in ribbon form in order to predetermine the ultimate thickness of the ribbon to be taken from the bath.

3. A method according to claim 1 of manufacturing flat glass of soda lime composition wherein the flow of the glass body to stable thickness on the bath is completed at a temperature above 850° C.

4. A method according to claim 1, wherein the glass during its advance along the bath passes through a protecting atmosphere maintained over the bath to prevent the formation of glass contaminants.

5. A method of manufacturing flat glass which comprises the steps of forming a ribbon of glass of predetermined dimensions and delivering the ribbon at a controlled rate to a bath of molten metal and advancing the ribbon along the surface of the bath under thermal conditions which transform the ribbon into a layer of molten glass, maintaining said glass layer in molten condition until there is developed on the surface of the bath a buoyant body of molten glass of stable thickness by permitting said layer of molten glass to flow laterally unhindered to the limit of its free flow under the influence of gravity and surface tension, and thereafter continuously advancing the buoyant body in ribbon form along the bath and sufficiently cooling this ribbon as it is advanced to permit it to be taken undamaged out of the bath by mechanical means.

6. A method of manufacturing flat glass, which comprises the steps of delivering molten glass at a controlled rate to a bath of molten metal and advancing the glass as a layer along the surface of the bath under thermal conditions which maintain said glass layer in molten condition until there is developed on the surface of the bath a buoyant body of molten glass of stable thickness by permitting said layer of molten glass to flow laterally unhindered to the limit of its free flow under the influence of gravity and surface tension, and thereafter continuously advancing the buoyant body in ribbon form along the bath, and sufficiently cooling this ribbon as it is advanced to permit it to be taken undamaged out of the bath by mechanical means.

7. A method of manufacturing flat glass comprising the steps of delivering glass at a controlled rate to a bath of molten metal and advancing it along the surface of the bath under thermal conditions which establish on the bath a buoyant body of molten glass having a viscosity low enough for the surface tension and gravitational forces to cause the glass to flow laterally on the surface of the metal bath, maintaining said glass body in molten condition, while permitting it in its advance to flow unhindered laterally across the bath, until the body reaches the limit of its free flow and attains a condition of equilibrium and therefore of stable thickness and a width which is less than the surface width of the bath, and continuously advancing the body of molten glass of stable thickness along the bath and sufficiently cooling it in its advance to permit it to be taken undamaged as a ribbon out of the bath by mechanical means.

8. An apparatus for producing a continuous ribbon of glass comprising, in combination, a furnace for melting glass, a tank containing a bath of molten metal and having an inlet and an outlet to and from the bath, regulated means for forming a ribbon of glass from the melted glass in the furnace and for delivering the ribbon of glass through the inlet to the bath at a controlled rate and advancing the glass along the surface of the molten metal, temperature regulators for maintaining thermal conditions along the bath which transform the formed ribbon into a molten state and assure that a buoyant layer of molten glass is first established on the bath and which then maintain said glass layer in molten condition until a buoyant body of stable thickness is developed therefrom on the bath surface, the configuration of the tank being such that at the bath surface and at least in the region where the said buoyant glass body of stable thickness is developed the width of the tank is greater than the width of the molten glass body of stable thickness, so as to permit said layer of molten glass to flow laterally unhindered to the limit of its free flow under the influence of gravity and surface tension, means for advancing the glass of stable thickness in ribbon form along the bath, and temperature regulators for the bath to cause the bath to sufficiently cool the ribbon thus formed to permit it to be taken undamaged through the outlet by mechanical means.

9. An apparatus for producing flat glass in ribbon form comprising, in combination, a tank containing a bath of molten metal and having an inlet and an outlet to and from the bath, said tank having side walls extending therealong, means for delivering glass at a controlled rate through the inlet to the bath and advancing the glass along the surface of the molten metal, temperature regulators for maintaining thermal conditions in the glass on the bath, which assure first the establishment of a layer of molten glass on the bath and then the maintenance of said layer of glass in molten condition until said layer flows laterally to the limit of its free flow under the influence of gravity and surface tension and thereby develops into a buoyant body of stable thickness and definite width, the distance between the side walls of said tank in the region where said buoyant body of stable thickness and definite width is developed being greater than said width to permit said buoyant body to develop without hindrance from said side walls, means for advancing the glass body of stable thickness in ribbon form along the bath and temperature regulators for the bath to sufficiently cool the ribbon thus formed to permit it to be taken undamaged through the outlet by mechanical means.

10. An apparatus for producing a continuous ribbon of glass according to claim 9, wherein said glass delivering means includes a furnace for melting the glass, spout pouring means leading from said furnace toward said inlet and means for regulating the rate of flow through said pouring means.

11. Apparatus for producing a continuous ribbon of glass according to claim 9, wherein ducting is provided in the roof structure and connected to a source of supply for maintaining a chemically suitable gas over the bath surface to inhibit the formation of contaminants for the glass.

12. Apparatus for producing a continuous ribbon of glass according to claim 9, wherein transverse pairs of horizontally disposed edge rolls are provided, said edge rolls acting only on the upper surface of the advancing glass in ribbon form, said rolls having their axes inclined to the ribbon edge, so that as they rotate they tend to prevent a reduction in the width of the ribbon and means for driving said edge rolls in a direction to assist in the advancement of the ribbon.

References Cited in the file of this patent

UNITED STATES PATENTS

| | | |
|---|---|---|
| 710,357 | Heal | Sept. 30, 1902 |
| 789,911 | Hitchcock | May 16, 1905 |
| 823,581 | Colburn et al. | June 19, 1906 |
| 1,041,329 | Mygatt | Oct. 15, 1912 |
| 1,422,036 | Crowley et al. | July 4, 1922 |
| 1,553,773 | Heal | Sept. 15, 1925 |
| 1,564,240 | Hitchcock | Dec. 8, 1925 |
| 1,692,813 | Brown | Nov. 27, 1928 |
| 1,735,595 | Blair | Nov. 12, 1929 |
| 1,748,587 | Smedley | Feb. 25, 1930 |
| 1,761,234 | Rowley | June 3, 1930 |
| 1,818,217 | Ferngren | Aug. 11, 1931 |
| 1,943,995 | Weld | Jan. 16, 1934 |
| 2,033,261 | Stewart | Mar. 10, 1936 |
| 2,125,912 | George et al. | Aug. 9, 1938 |
| 2,478,090 | Devol | Aug. 2, 1949 |
| 2,608,798 | Sharp | Sept. 2, 1952 |